United States Patent [19]

Kokawa et al.

[11] Patent Number: 5,596,429
[45] Date of Patent: Jan. 21, 1997

[54] LIQUID CRYSTAL DISPLAY

[75] Inventors: Shozo Kokawa; Michiharu Nishihara; Yukikazu Sato, all of Yaita, Japan

[73] Assignee: Sharp Kabushiki Kaisha, Osaka, Japan

[21] Appl. No.: 502,847

[22] Filed: Jul. 14, 1995

Related U.S. Application Data

[62] Division of Ser. No. 69,392, Jun. 1, 1993, Pat. No. 5,467,208.

[30] Foreign Application Priority Data

| Jun. 1, 1992 | [JP] | Japan | 4-165298 |
| Sep. 2, 1992 | [JP] | Japan | 4-234556 |
| Dec. 25, 1992 | [JP] | Japan | 4-345012 |
| Jan. 21, 1993 | [JP] | Japan | 5-27457 |

[51] Int. Cl.$^6$ .............................................. G02F 1/1335
[52] U.S. Cl. ..................... 349/67; 349/62; 349/64; 349/65
[58] Field of Search ................. 359/40, 41, 42, 359/48, 49, 69, 62; 362/26, 31; 385/901; 156/97, 107, 145, 272.8, 286, 290, 299, 291, 308.4

[56] References Cited

U.S. PATENT DOCUMENTS

| 4,686,519 | 8/1987 | Yoshida et al. | 350/350 |
| 4,715,686 | 12/1987 | Iwashita et al. | 250/350 |
| 4,883,343 | 11/1989 | Teshirogi | 350/350 |
| 4,936,657 | 6/1990 | Tejima et al. | 350/350 |
| 4,984,144 | 1/1991 | Cobb, Jr. et al. | 350/350 |
| 5,123,077 | 6/1992 | Endo et al. | 350/350 |
| 5,126,882 | 6/1992 | Oe et al. | 350/350 |
| 5,151,801 | 9/1992 | Hiroshima | 350/350 |
| 5,161,041 | 11/1992 | Abileah | 350/350 |
| 5,179,459 | 1/1993 | Plesinger | 350/350 |
| 5,243,506 | 9/1993 | Whitehead | 350/350 |
| 5,262,880 | 11/1993 | Abileah | 350/350 |
| 5,289,351 | 2/1994 | Kashima et al. | 362/31 |
| 5,359,691 | 10/1994 | Tai et al. | 350/350 |
| 5,394,255 | 2/1995 | Yohota et al. | 350/350 |
| 5,402,324 | 3/1995 | Yokoyama et al. | 350/350 |
| 5,422,751 | 6/1995 | Lewis et al. | 359/48 |

FOREIGN PATENT DOCUMENTS

| 469321 | 2/1992 | European Pat. Off. . |
| 4008953 | 10/1990 | Germany . |
| 61-15104 | 1/1986 | Japan . |
| 277726 | 3/1990 | Japan . |
| 262417 | 3/1990 | Japan . |
| 3085586 | 4/1991 | Japan . |
| 3188420 | 8/1991 | Japan . |
| 4146401 | 5/1992 | Japan . |
| 26965 | 5/1913 | United Kingdom . |
| 317562 | 8/1929 | United Kingdom . |
| 2215109 | 9/1989 | United Kingdom . |

OTHER PUBLICATIONS

IBM Technical Discl. Bulletin, "Polarized Backlight For Liquid Crystal Display", vol. 33, No. 1B, Jun., 1990, pp. 143–144.
Abstract of Japanese Pat. App. 4146401, May 20, 1992.
Abstract of Japanese Pat. App. 3085586 Apr. 10, 1991.
Abstract of Japanese App. JP55117110, publication date Sep. 9, 1980.
Abstract of Japanese App. JP4030120, publication date Mar. 2, 1992.
IBM Technical Discl. Bulletin, "Structure of Liquid Crystal Display", vol. 33, No. 1B, Jun., 1990, pp. 143–144.
Abstract of Japanese App. JP2032389, publication date Feb. 2, 1990.

*Primary Examiner*—William L. Sikes
*Assistant Examiner*—James A. Dudek

[57] ABSTRACT

A back lighted liquid crystal display including a light converging assembly, a light-guiding plate, a reflecting plate, and a diffusing plate integrally welded together outside of the display area and a display having a housing configuration where horizontal and vertical integrated circuit driver chips are mounted on respective adjacent peripheral edge portions of a glass plate member of a liquid crystal panel and where an illuminating lamp is mounted for easy removal on an opposite edge from the edge portions where the driver chips are located.

6 Claims, 17 Drawing Sheets

LIQUID CRYSTAL DISPLAY

This application is a divisional of application Ser. No. 08/069,392, U.S. Pat. No. 5,467,208 filed on Jun. 1, 1993, the entire contents of which are hereby incorporated by reference.

BACKGROUND OF THE INVENTION

The present invention relates to a liquid crystal display and, more particularly, to a lighting device using a prism lens for converging back light rays and for use in a back lighting device for liquid crystal displays, and a transmission type liquid crystal display for use in a portable type personal computer, word processor and liquid crystal television set and so on, and a back lighting device suitable for use in a transmission type liquid crystal display such as a portable type personal computer, a word processor, a liquid crystal television set etc., and more particularly, to a back lighting device using a light guiding plate.

Liquid crystal displays (LCD) do not radiate light and are required to be illuminated when they are being used. Accordingly, liquid crystal displays are each provided with a back light for ensuring the necessary luminosity. A back light is composed of a light source and a light diffusing element. Lighting from a light source such as an incandescent lamp (point-light source), a fluorescent lamp (line-light source) and the like is converted from a light diffusing element to surface light for illuminating a liquid crystal display from the back. There are many kinds of proposed liquid crystal displays provided with back lights.

For example, the publication of the unexamined patent application JP,A,2-77726 discloses a liquid crystal display which has an aspherical condenser lens placed between a point light source and a liquid crystal panel and has an aspherical Fresnel lens.

The publication of the unexamined patent application JP,A,61-15104 discloses a liquid crystal display which has a light diffuser composed of a plurality of photoconductors disposed stepwise between a line light source and a diffusing plate having triangle-pole prisms disposed thereon.

The publication of the unexamined utility model application JP,U,2-62417 discloses a liquid crystal display which has a transparent plate between the light source and the diffusing plate and the transparent plate has a plurality of grooves placed thereon to function as a prism opposite the light source.

As one of the means to increase the luminosity of the display light a method is proposed for increasing the luminosity of the display light in a specified direction by converging diffused light of the back lighting device by the use of a prism lens.

As mentioned above, the application of a conventional prism lens may increase the luminosity of a liquid crystal (LC) display in a specified direction but it produces a viewing angle with no quantity of light. This may impair the quality of the image on the LC display. Accordingly, a diffusing sheet is usually used between a prism lens and a liquid crystal (LC) panel. This means that light rays are converged and diffused again. Therefore the intended effect of the use of the prism lens cannot be attained. It is possible to omit the diffusing sheet by increasing the vertex angle of a prism lens to the level at which the effect of a non-lighting quantity angle may be negligible. However, this may have little effect on the prism lens since the prism has an increased vertex angle that has decreased the converging power.

The conventional liquid crystal display produces such a problem that external light may be reflected by front and rear surfaces of a transparent protection plate, a front surface of and in a liquid crystal panel, thereby its image visibility is impaired.

The conventional liquid crystal displays have a limit in achieving reduction of their thickness and, at the same time, the increase of the brightness of their display screens. For instance, it is difficult to reduce the thickness of the liquid crystal display using a direct bottom-reflecting type back light. An attempt to increase luminance of the lamp by increasing current is accompanied by heating of the lamp, which leads to the damaging of the IC chips for the horizontal and vertical drivers disposed at the periphery of the display screen. It was difficult to satisfy both above-mentioned requirements at the same time.

One of the disadvantages of the conventional light-guiding type back lighting device is that separate components may expand to create uneven spacing therebetween or be displaced during the assembly thereby causing uneven luminosity by the back light rays during the operation of the devices. In particular, in the case of assembling very thin components, e.g., 0.2 mm thick converging, diffusing and reflecting plates, extreme care must be taken to prevent the expansion and displacement and also to avoid the erroneous positioning of the components and of damage from dirt on their surfaces that may cause dark and luminescent spots on an image on the display screen of the liquid crystal panel. In addition, any conventional back light device may leak light rays through a gap between its lamp and light guiding plate and the device and its holder that causes the weaker luminosity of an image on the liquid crystal panel.

The other disadvantage of the prior art is as follows: liquid crystal panels have a view angle characteristic that is particularly narrow in its vertical direction. Therefore, even if back light rays are applied uniformly at all visual angles to a liquid crystal display panel, the picture image quality of the display can be scarcely improved because of the very narrow viewing angle of the panel in a vertical direction.

The present invention aims to achieve an increase in luminosity and to decrease the reflection of a liquid crystal display provided with an edge, light-type back lighting unit.

Technical subjects are (1) increasing the luminosity of a back lighting unit and (2) reducing the reflection of a liquid crystal panel.

Regarding the subject (1), the present invention proposes a back light that comprises a lamp (light source), a light guiding plate, a diffusing plate and a converging plate. On the other hand, Japanese publications of unexamined application JP,A,61-15104 and JP,U,2-62417 disclose the relevant prior art. The former prior art is similar to the present invention in the application of an edge light-type back lighting unit, but said unit is composed of a light source, a light-guiding plate and a double-layered diffusing plate to eliminate the unevenness of the light for illuminating a liquid crystal panel. The latter prior art used a direct bottom-reflecting type back light which was composed of a light source, a converging plate and a diffusing plate through which light rays illuminated the liquid crystal panel while the present back lighting device, according to the present invention, is to illuminate the liquid crystal panel with back light rays through the use of a converging plate.

Essentially, the former prior art was intended to prevent uneven luminosity within the display screen only and the latter prior art was intended to increase (to the maximum) the luminosity of a specified position within the display screen not taking into account the uneven luminosity therein. The present invention proposes to increase the front axial luminosity of the display screen and at the same time to prevent the uneven luminosity thereon as much as possible.

Regarding the subject (2), the present invention proposes that a liquid crystal panel and a transparent protection plate having an AR coat (reflecting coat) applied on its front surface are stuck together with adhesive.

The publication of unexamined patent application, JP,A, 3-188420 discloses a device which applies a combination of a circular light-deflecting disc and a ¼-phasing substrate to suppress light reflection in and at surface of a panel and at the rear surface of a protection plate. This combination, however, requires provision of an air gap between the panel and the transparent protection plate. The present invention aims to eliminate the light reflection by surface of the liquid crystal panel and by the rear surface of the transparent protection plate by sticking the protection plate and the panel together with adhesive.

SUMMARY OF THE INVENTION

It is an object of the present invention to provide a converging unit which is capable of effectively converging light rays by using a prism lens without the use of a diffusing sheet and which is suitable for use in a back lighting device, making it possible to manufacture the back lighting unit in a thinner size and at a lower cost.

It is another object of the present invention to provide a liquid crystal display which is capable of having an increased luminosity of its display screen with a reduced thickness of its whole system.

It is another object of the present invention to provide a liquid crystal display with a back light, which has an improved visibility and an increased front axial luminosity of the display screen by effectively using diffused light rays in diagonal direction from the back light through a converging system having a directional characteristic with a peak luminosity in the front direction and substantially corresponding to that of the liquid crystal panel and by suppressing the reflection of external light by the liquid crystal panel.

To achieve the above-mentioned objects, the present invention proposes that a liquid crystal panel comprising at least a sheet of color filter glass and a light deflecting plate is covered with a transparent protection plate bonded thereon to protect the front surface of the panel and form the anti-reflection layer for suppressing the reflection of external light by the surface thereof.

It is possible to provide a prism lens unit which is capable of effectively converging back light for a liquid crystal display by eliminating a non-lighting quantity angle and by giving variety to vertex angles of the prism portions with no diffusing sheet which was usually applied in the prior art. Application of this prism lens therefore enables a back lighting device to be thinner in size and adapted for low cost manufacturing.

A liquid crystal display, according to the present invention, can be made thinner in size since a fluorescent lamp is disposed at the side surface of the back lighting unit. IC chips for drivers are disposed on a liquid crystal panel so far from a lamp unit that they may not damage, with increased luminosity, the display screen. A lamp unit can be removably secured to a liquid crystal display holder and therefore it can be easily replaced with a new one.

A back lighting device, according to the present invention, wherein between a liquid crystal panel and a diffusing plate is disposed a converging plate having a large number of prism-like grooves arranged at intervals sufficiently narrower than the spacing of picture elements in the vertical direction of a liquid crystal panel, can converge upward reflecting and downward reflecting light rays in an axial direction to increase front luminosity on the display screens thereby effectively using the back light rays.

According to the present invention, it is possible to provide a light-guiding type back lighting unit comprising a light guiding plate, a lower reflecting plate, a diffusing plate, a converging plate having a large number of prism-like grooves arranged at intervals sufficiently close in relation to the vertical picture elements of the liquid crystal display screen, wherein all above-mentioned components are each welded at a portion of the periphery to form an integrated back lighting unit with elements of high reflecting power covering the side surfaces of the light guiding plate, internal surfaces of a back light's holder and the protrusion of the diffusing plate. A thus constructed back light unit is free from uneven luminosity due to the displacement of the components during the unit assembly and has no leakage of light rays thereby ensuring the highly effective use of the back light's rays.

PREFERRED EMBODIMEMT OF THE INVENTION

As one of the means to increase the luminosity of the display light, a method is proposed for increasing the luminosity of the display light in a specified direction by converging diffused light of the back lighting device by the use of a prism lens. The mechanism of a prism lens according to the prior art will be described in detail with reference to the accompanying drawings.

Figure 1A:
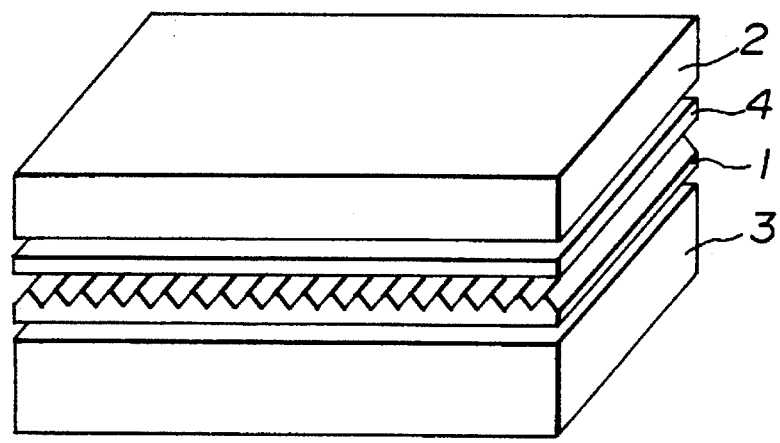
FIG. 1A and FIG. 1B are views for explaining the converging action of a prism lens of the prior art.
Figure 1B:
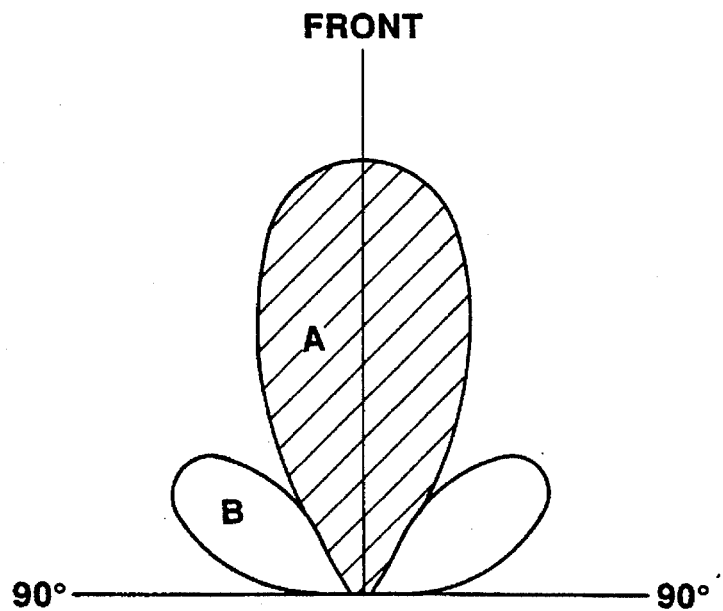

FIGS. 1A, 1B are views for explaining the converging function of a prism lens: FIG. 1A is a general construction view of a liquid crystal display and FIG. 1B shows a view angle characteristic of a prism lens, wherein A and B represent portions of the light's quantity distribution. A sheet 1 comprises small assembled pieces of prism lenses. Number 2 designates a liquid crystal panel and number 3 designates a back light composed of a light guiding plate, a reflecting plate, a diffusing plate and a light source, e.g. a fluorescent tube, electroluminescence or daylight and number 4 designates a diffusing sheet.

Figure 2:
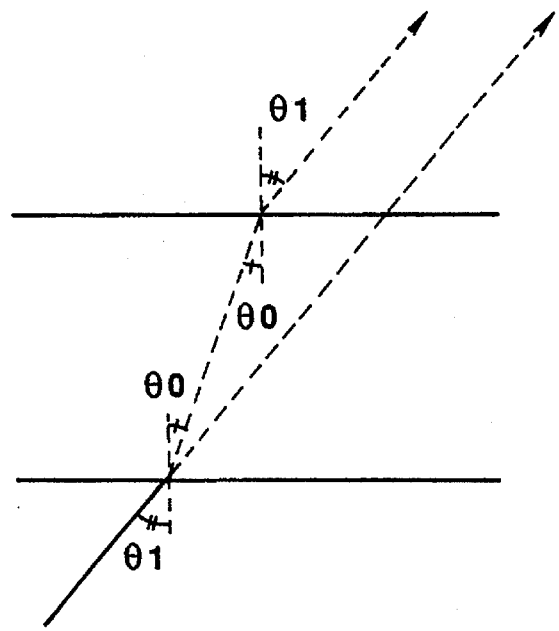
FIG. 2 is a view for explaining the law of light refraction of a prism lens from the prior art.

FIG. 2 shows the law of light refraction. When a light beam enters at an incident angle $\Theta_1$ into a medium having a refractive index n, the light beam refracts at $\Theta_0$ as expressed by the following formula:

$$\Theta_0 = \sin^{-1}((\sin\Theta_1)/n) \quad (1)$$

When the refracted beam passes from the medium to the air, it refracts again at an angle $\Theta$ expressed by the following formula:

$$\begin{aligned} \Theta &= \sin^{-1}(n \times \sin\Theta_0) \quad (2) \\ &= \sin^{-1}(n \times \sin(\sin^{-1}(\sin\Theta_1)/n)) \\ &= \Theta_1 \end{aligned}$$

The formula (2) shows that an incident angle of light is equal to the departure angle if the incident plane and departing plane are parallel to each other.

Figure 3:
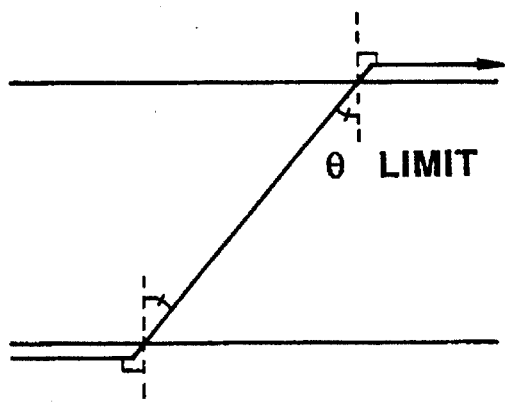
FIG. 3 is a view for explaining the critical reflecting angle of a light for a prism lens from the prior art.

FIG. 3 shows a critical reflecting angle of light. A light ray enters a medium at an incident angle of 90° and refracts at an angle $\Theta_{limit}$ expressed by the following formula. Therefore, if an incident angle of a light beam exceeds this angle, no refraction can occur and all the light energy is reflected by the interface. This angle is called a critical reflection angle.

$$\begin{aligned} \Theta_{limit} &= \sin^{-1}((\sin 90°)/n) \quad (3) \\ &= \sin^{-1}(1/n) \end{aligned}$$

Figure 4:
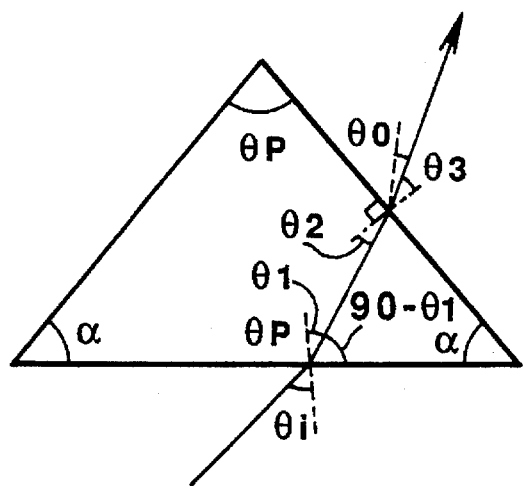
FIG. 4 is a view for explaining the refraction state of a prism lens of the prior art.

FIG. 4 shows the refractive state of a prism lens. A light beam enters a medium at an incident angle of $\Theta i$ and refracts at a refraction angle of $\Theta_1$ expressed by the formula (1). If a vertex angle of a prism lens is denoted by $\Theta_p$, the refracted light beam encounters the boundary of the prism lens at the angle $\Theta_2$ expressed by the following formula.

$$\Theta_2 = 90° - \Theta_1 - \Theta_p/2 \quad (4)$$

The light beam departs from the prism lens at an angle $\Theta_3$ (the angle made by the ray to an imaginary line perpendicular to the prism's surface) expressed by the following formula:

$$\Theta_3 = \sin^{-1}(n \times \sin\Theta_2) \quad (5)$$

Finally, the light beam appears as refracted at an angle $\Theta_0$ expressed by the formula:

$$\begin{aligned} \Theta_0 &= 90° - \Theta_p/2 - \Theta_3 \quad (6) \\ &= \alpha - \sin^{-1}(n \cdot \sin(\alpha - \sin^{-1}(\sin\Theta_1)/n)) \\ &\quad (\alpha = 90° - \Theta_p/2) \end{aligned}$$

This departing light beam corresponds to portion A of the quantity of light distributed as shown in FIG. 1.

When an incident angle $\Theta_1$ of the light beam substantially equals 90°, its departure angle may have the following expression:

$$\Theta_0 = \alpha - \sin^{-1}(n \cdot \sin(\alpha - \sin^{-1}(1/n))) \quad (7)$$

If the departure angle of a light beam exceeds the above-mentioned value, no light appears and brightness is sharply reduced. This critical angle will be called no-light angle.

Figure 5:
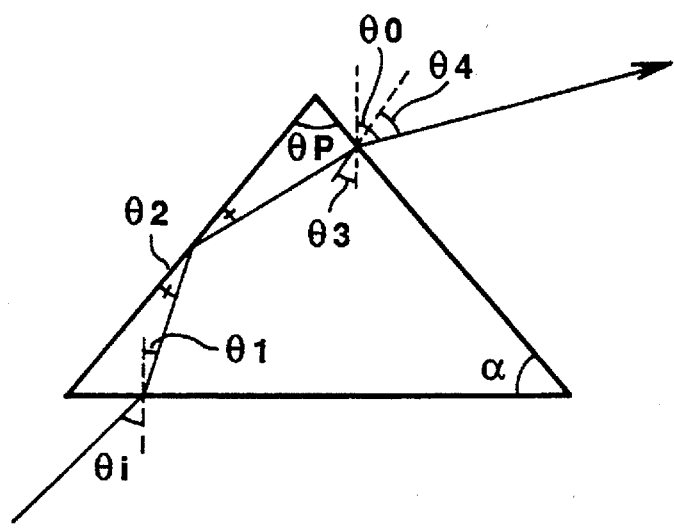
FIG. 5 is a view for explaining another refraction state of a prism lens of the prior art.

FIG. 5 shows another refraction state of a prism lens. A part of a light beam appears from the prism lens after reflecting therein. A light beam enters into the prism at an incident angle $\Theta i$ and becomes a refracted beam bent at the angle $\Theta_1$ to be determined by the formula (1). When the vertex angle of the prism is denoted by $\Theta_p$, the refracted light beam encountering the boundary of the prism lens at the angle $\Theta_2$ is expressed by the following formula:

$$\Theta_2 = \Theta_p/2 - \Theta \quad (8)$$
$$(90° - \Theta_1 = \Theta_2 + 90° - \Theta_p/2)$$

If $\Theta_2$ is smaller than the critical reflecting angle determined by the formula (2), the light beam totally reflects at the boundary surface of the prism lens. This refracted beam encounters the boundary of the prism lens at the angle $\Theta_3$ expressed by the following formula:

$$\Theta_3 = \Theta_2 + \Theta_p - 90° \; (\Theta_3 = 180° - 90° - (180° - \Theta_p - \Theta_2)) \quad (9)$$

This light beam passes through the prism lens at an angle $\Theta_4$ (the angle made by the ray to an imaginary line perpendicular to the prism's surface) expressed by the formula:

$$\Theta_4 = \sin^{-1}(n \times \sin\Theta_3) \quad (10)$$

Finally, the light beam appears refracted at an angle $\Theta_0$ expressed by the following formula:

$$\begin{aligned}\Theta_0 &= 90° - \Theta_p/2 - \Theta_4 \\ &= \alpha + \sin^{-1}(n \cdot \sin(\Theta_p - \alpha - \sin^{-1}(\sin\Theta_1)/n)) \\ &\quad (\alpha = 90° - \Theta_p/2)\end{aligned} \quad (11)$$

This departing light beam corresponds to portion B of the quantity of light distributed as shown in FIG. 1B.

Figure 6:
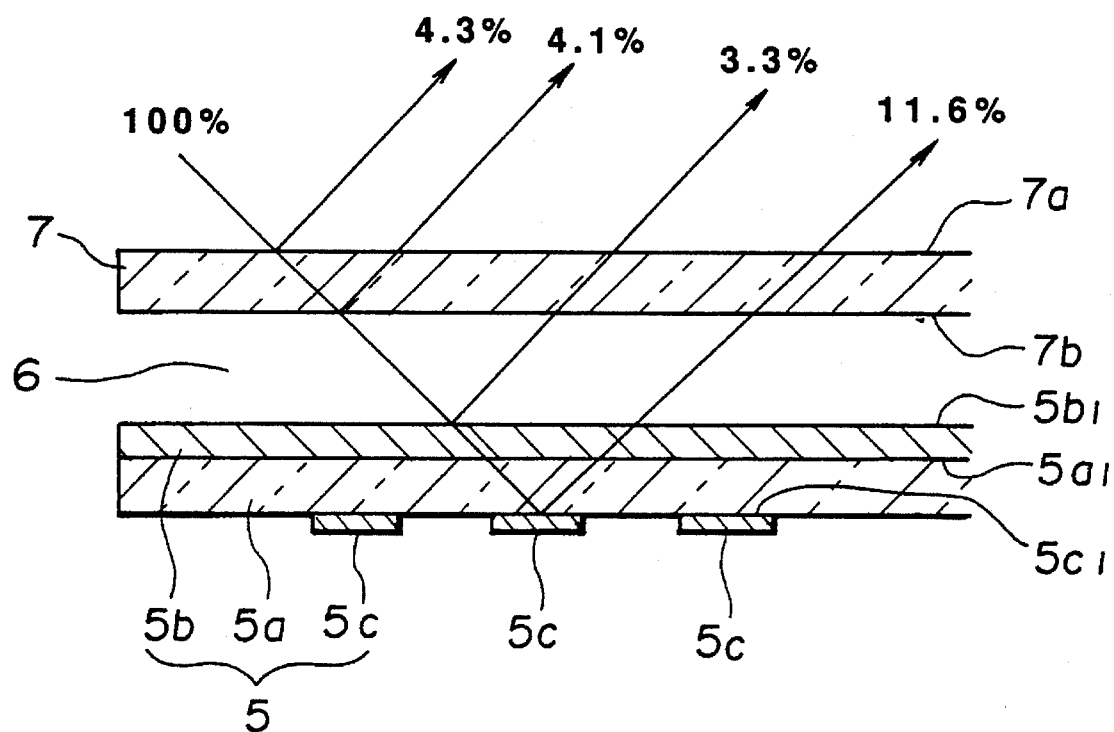
FIG. 6 is a typical conventional liquid crystal display of a transmission back-lighted type.

FIG. 6 is a typical conventional liquid crystal display of transmission back-lighted type that comprises a liquid crystal panel 5 including a color filter glass 5a, a deflection plate 5b, a black matrix 5c and so on, for obtaining an image transmission light from a white light emitted from a back light (not shown), and a front transparent plate 7 made of acrylic resin and the like and disposed with an air-gap layer 6 on the front side of the liquid crystal panel (opposite to the side facing to the back light). The front transparent plate 7 serves to protect the liquid crystal panel 5 against direct application of mechanical force and contamination by dusts and dirt.

In thus constructed liquid crystal display, white light from a back light (not shown) enters the liquid crystal panel 5 and passes therethrough to form an image on a display screen by light rays transmitted through the air-gap layer 6 and the front transparent plate 7.

On the other hand, one of the factors affecting the visibility of the liquid crystal display is reflection of the external light at the front surface of the liquid crystal display. Generally, the reflectance of light at an interface between two media having different refractive indices has the following expression:

Light Reflectance $R = [(n_1 - n_2)^2/(n_1 + n_2)^2] \times 100 \; (\%)$ where $n_1$ and $n_2$ are refractive indices.

Reflected light rays are produced thereat at a the above-mentioned reflectance.

The reflection of external light is described further in detail as follows:

When the external light encounters a front (incident) surface 7a of the front transparent plate 7 that is assumed to have a refractive index 1.5% and a transmittance 92%, about 4.3% of the incident light is reflected by the surface 7a and about 4.1% of the incident light is reflected by the rear surface 7b of the front transparent plate 7. When the incident light passing through the front transparent plate 7 strikes a front surface $5b_1$ of the deflecting plate 5b that is assumed to have a refractive index 1.49% and a transmittance 41%, about 3.3% of the incident light is reflected by the surface $5b_1$. When the incident light passing through the deflecting plate 5b encounters a surface $5c_1$ of the black matrix 5c on the color filter glass 5a on the assumption that a reflectance of the black matrix is 30%, an aperture ratio of picture elements is 40% and a transmittance of the color filter glass 5a is 95%, about 11.6% of the incident light is reflected by the surface 5c of the black matrix 5c. The reflection of the external light at a front surface $5a_1$ (the boundary on the deflecting plate 5b) of the color filter glass 5a is negligible since the refractive index of color filter glass 5a is nearly equal to that of the deflecting plate 5b.

As mentioned above, the conventional liquid crystal display reflects totally about 23.3% of external incident light from its front surface, that may impair the visibility of an image indicated on the display screen. Particularly, under a plenty of external light, the reflected light becomes brighter than the picture image of the liquid crystal display, that may remarkably affect the display image contrast, i.e. impairing its visibility.

Accordingly, to improve the visibility of the liquid crystal display by reducing reflected light rays at its front surface it has been proposed and adopted to apply antireflection coating to the front transparent plate of the liquid crystal display.

The prevention of light reflection by this thin film having an anti-reflection coating is based on that the anti-reflection coating may cause an incident light beam having a certain wavelength entered thereinto to be reverse in phase to a light beam reflected by rear surface thereof to cancel each other. This eliminates the reflection of the light toward the front surface thereof.

Increasing the quantity of anti-reflection coatings may suppress reflection of light beams of all wavelengths.

Conventional transmission-type liquid crystal displays for use in liquid crystal television sets have used mainly a direct reflecting type back lighting units shown in FIGS. 7A, 7B or FIGS. 8A, 8B.

Figure 7A:
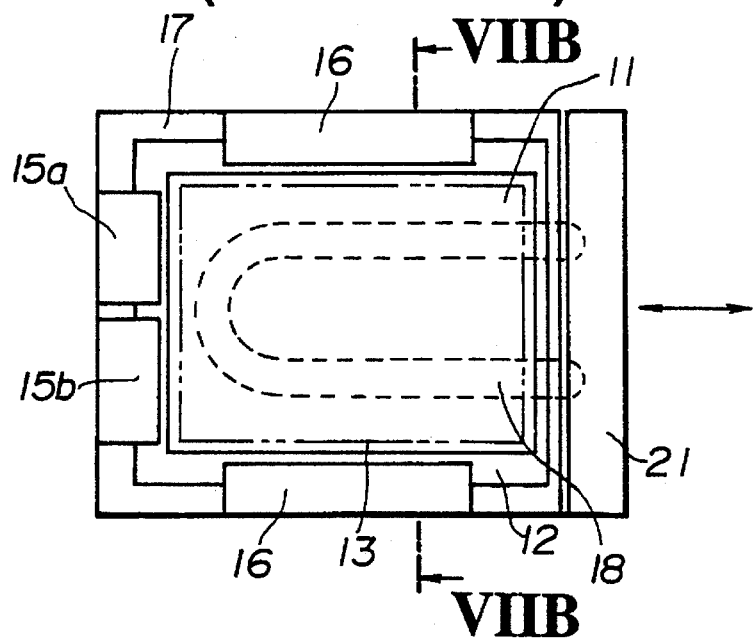
FIG. 7A is a front view of an example of a conventional liquid crystal display.
Figure 7B:
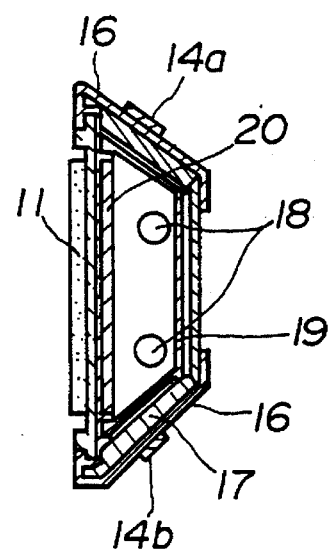
FIG. 7B is a sectional view along line VIIB—VIIB of FIG. 7A.

FIGS. 7A and 7B show a back lighting unit using a U-shaped fluorescent lamp, wherein IC chips 14a and 14b for a horizontal driver are mounted by TAB (tape automated bonding) on the upper edge and the lower edge, respectively, of a glass plate 12, and IC chips 15a and 15b for a vertical driver are mounted by TAB on the left edge of the glass plate 12. The IC chips 14a, 14b and 15a, 15b are connected to a drivers' substrate 16 by means of a member enclosing a liquid crystal display holder 17. A lamp unit 13 composed of a U-shaped fluorescent lamp 18, a reflecting plate 19, a diffusing plate 20 and an inverter unit 21 is inserted into the liquid crystal holder 17 from the right side thereof. The inverter unit 21 includes a lamp driving circuit and electrically connected to the U-shaped fluorescent lamp 18. The fluorescent lamp 18 can be exchanged with a new one after taking out the lamp unit 13 from the holder 17 in the direction shown by the arrows A.

In a thus constructed liquid crystal display, the driver's TAB package is bendable to reduce the size of the screen's frame, but it is difficult to make the U-shaped lamp 18 smaller in diameter, thereby the lamp unit 13 must be thick in size, increasing the total thickness of the liquid crystal display.

Figure 8A:
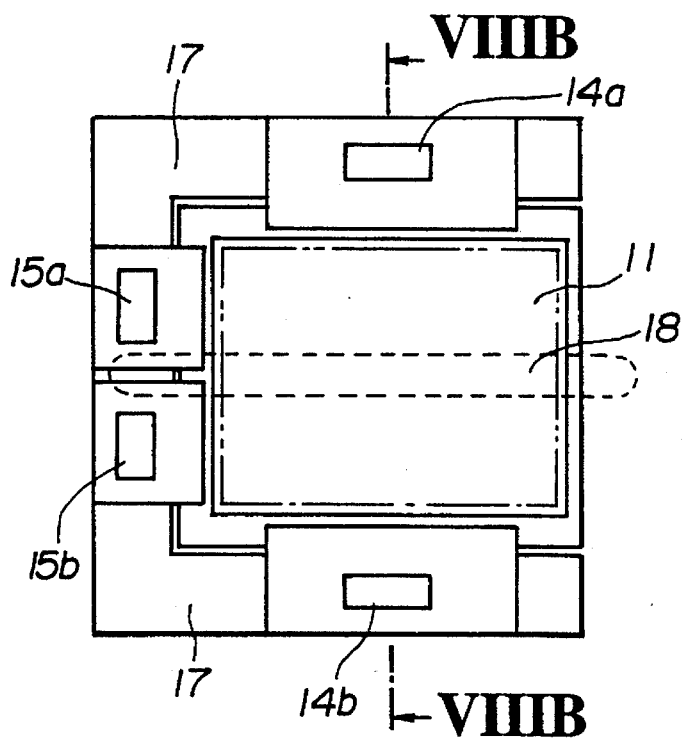
FIG. 8A is a front view of another example of a conventional liquid crystal display.
Figure 8B:
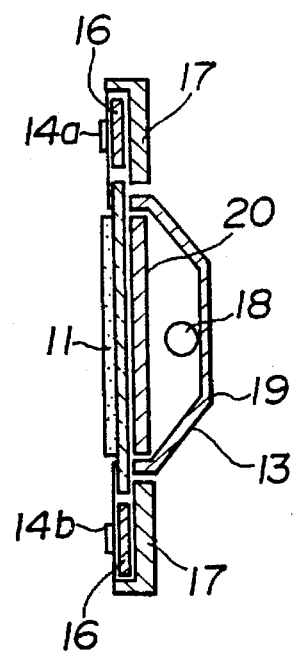
FIG. 8B is a sectional view along line VIIIB—VIIIB of FIG. 8A.

FIGS. 8A and 8B show a liquid crystal display which uses a straight tube type fluorescent lamp 18 and is similar in construction to the liquid crystal display of FIGS. 7A and 7B. In this case, IC chips 14a, 14b for a horizontal driver, IC chips 15a, 15b for a vertical driver and a drivers' substrate 16 are mounted on the same plane with a liquid crystal panel 11 to reduce the thickness of the liquid crystal display. The straight tube-type fluorescent lamp 18 may have a reduced diameter. This enables the lamp unit 13 to be thinner thereby assuring the possibility of reducing the thickness of the liquid crystal display.

Figure 9:
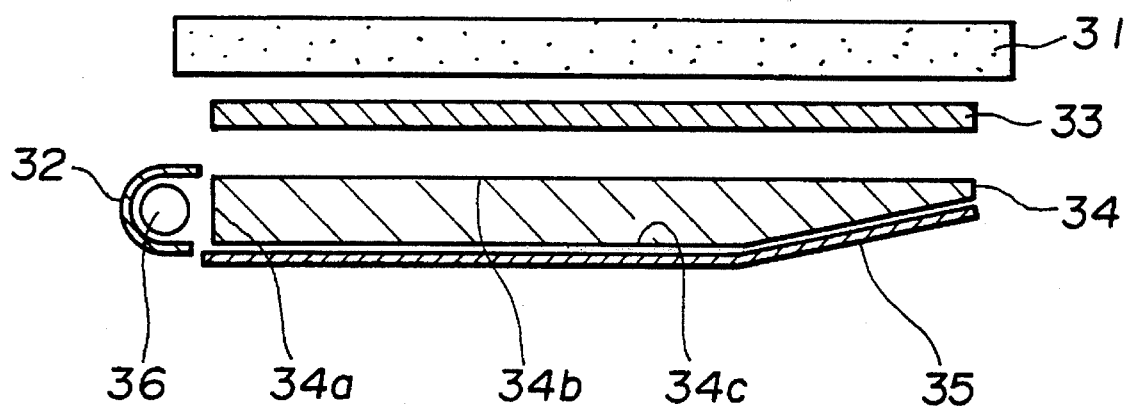
FIG. 9 is a schematic view of a conventional back lighting device of a light-guiding type.
Figure 10:
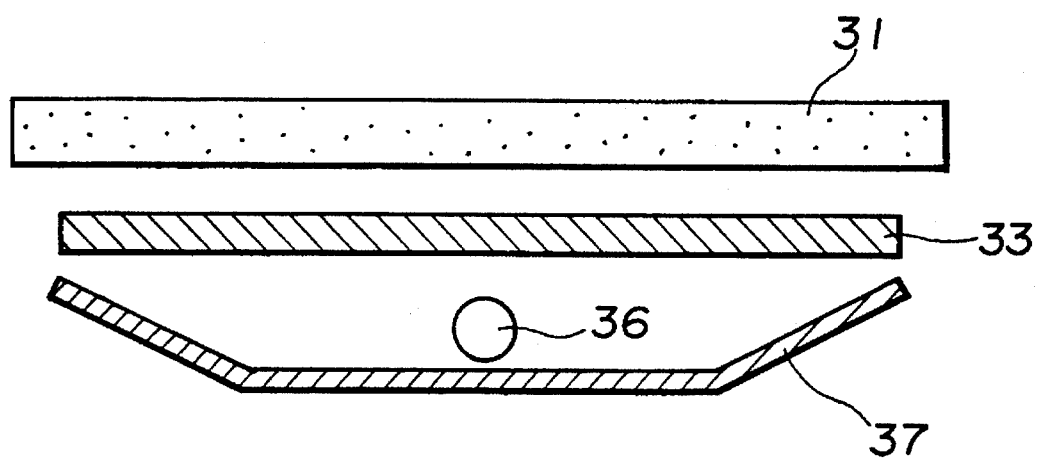
FIG. 10 is a schematic view of a conventional back lighting device of a direct bottom reflecting type.

FIGS. 9 and 10 are construction views of conventional transmission type liquid crystal displays which are provided with, respectively, a back lighting device of a light-guiding type (FIG. 9) and a back lighting device causing bottom reflection (FIG. 10). In FIGS. 9 and 10, there are shown a liquid crystal panel 31, a reflector 32, a diffusing plate 33, a light guiding plate 34 having a lateral inlet surface 34a, a front surface 34b and a bottom surface 34c, a reflecting plate 35, a fluorescent lamp 36 and a reflecting plate 37.

In FIG. 9, there is illustrated the back lighting device of a light-guiding type wherein light rays from the fluorescent lamp 36 enter directly or, after being reflected at the reflector 32, into the light guiding plate 34, through the lateral inlet surface 34a, then repeatedly reflected at the bottom surface 34c and the front surface 34b thereof and then are emitted as homogeneous back lighting rays directed upward from the front surface thereof. At the back of the light guiding plate 34 is placed the reflecting plate 35 by which light rays, leaking from the bottom surface of the light-guiding plate 34, are reflected and returned into the light-guiding plate 34, thereby the light rays can be effectively used. Light rays emitted from the light-guiding plate 34 are diffused in the diffusing plate 33 into homogeneous diffused light having limited directionality and which illuminates the liquid crystal panel 31.

Figure 26:
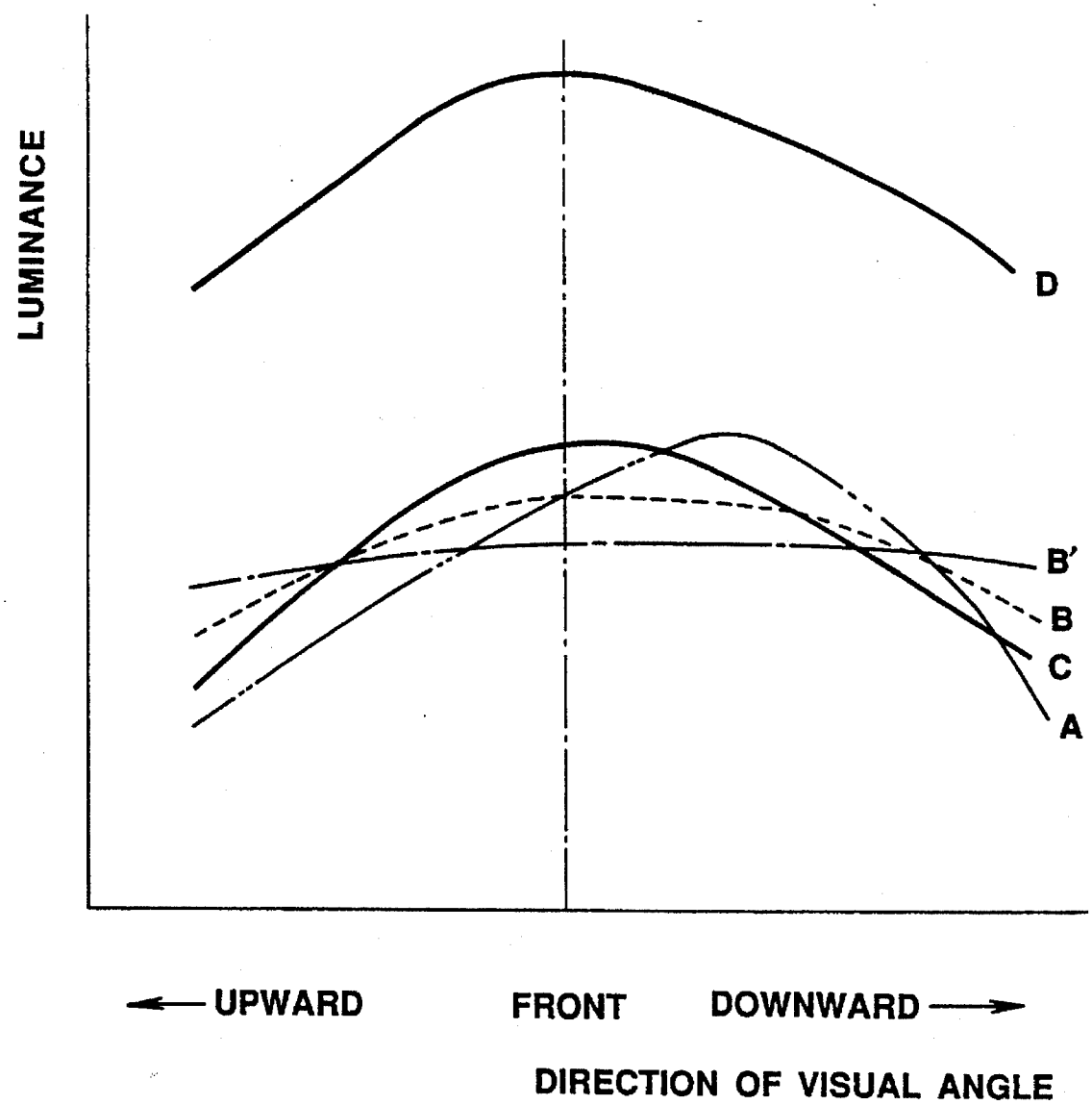
FIG. 26 shows a view angle versus the luminosity of a back lighting device according to the present invention.

Referring to FIG. 26, in the case of such a construction having a lamp arranged at the upper portion of the liquid crystal display, light rays from the light-guiding plate 34 have directionality A with peak lighting obtainable when observed from a lower position, i.e., the directionality does not correspond to the view angle D of the liquid crystal panel. This means that the maximum lighting on the display cannot be obtained when observing the display screen from the front.

Therefore, the light-guiding plate 34 is generally placed at the front surface with the diffusing plate 33 to obtain homogeneous light rays of a relatively small directionality B' as shown in FIG. 26. Another similar example of the prior art is a back lighting device which has a converging plate placed at the front surface of the light-guiding plate 34 and has a diffusing plate 33 placed on the converging plate. However, such modifications cannot produce the intended effect because the back light rays are converged but then diffused again.

All the components and a holder for the back lighting device are provided with ribs and assembled on the holder through the use of ribs. However, since the components are thin and not attached to each other, they may become displaced in the course of assembling thereby causing uneven luminosity by the back light rays.

Another typical example of the prior art is a direct bottom-reflecting type back lighting device which may employ a variety of straight tubular, U-shaped and W-shaped lamps. The device shown in FIG. 10 includes a straight tubular type fluorescent lamp. Back light rays from the lamp 36 are injected directly or, after reflection by a reflecting plate 37, into a diffusing plate 33 through which homogeneously diffused light rays are irradiated to a liquid crystal display panel 31.

Figure 11A:
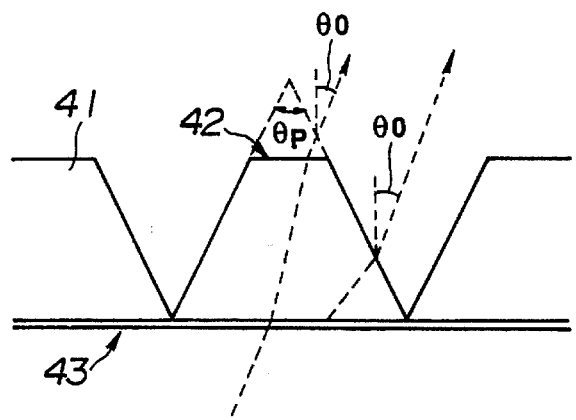
FIG. 11A shows a prism lens embodied in the present invention.
Figure 11B:
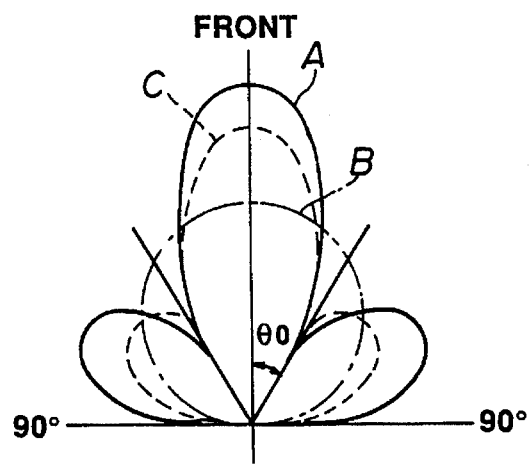
FIG. 11B shows the visual characteristic of the prism lens shown in FIG. 11A.

Referring now to the accompanying drawings, preferred embodiments of the present invention will be described in detail as follows:

FIGS. 11A and 11B are views, respectively, showing a refraction characteristic FIG. 11A and a view angle characteristic FIG. 11B of a prism lens embodied in the present invention. In FIG. 11A, numerals 41 and 42 designate a prism portion and a flat portion, respectively, of a prism lens and numeral 43 designates the prism lens itself. In FIG. 11B, represents a portion of a view angle characteristic of a prism portion and B represents a portion of a view angle characteristic of a flat portion and C represent a portion of a view angle characteristic of the whole system. In the shown case, a flat portion 42 is provided on the top of a prism portion 41, however, the same effect can be achieved by providing a flat portion 42 between the prism portions 41 or on the top of the prism portions and between the prism portions. When the vertex angle of a prism is expressed as $\Theta p$ in FIG. 11A, a non-lighting quantity angle of the prism lens may have the following expression:

$$\Theta_0 = \alpha - \sin^{-1}(n \cdot \sin^{-1}(\alpha - \sin^{-1}(1/n))) \text{ (where } \alpha = 90° - \Theta_p/2)$$

Since no light appears at angles greater than this angle, a single prism lens sharply loses luminance. However, according to the present invention, as described in relation to the expression (2), the flat portion at which an incident angle of a light beam equal to its departure angle and $\Theta_0$ is smaller than 90° so therefore the light beam appears at the angle $\Theta_0$. The intensity of the light beam, directed in the direction of angle $\Theta_0$, can be adjusted by means of a duty ratio of the flat portioned area to the prism lens area.

Figure 12:
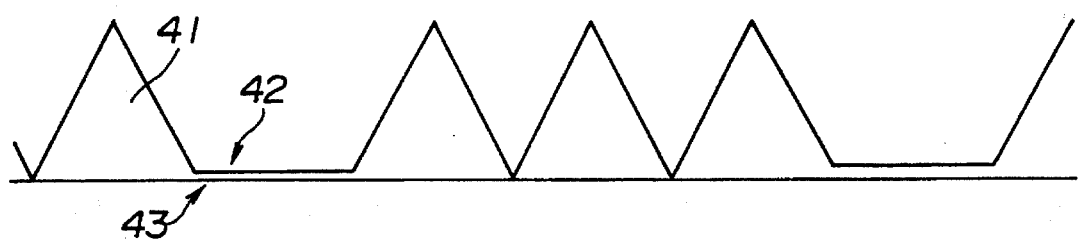
FIG. 12 shows another embodiment of the prism lens, according to the present invention, which is capable of adjusting the visual characteristic by means of a surface area of a flat portion and a quantity of prism portions.

Referring to FIG. 12, a plurality of prism portions 41 are arranged with flat portions 42 each between two prism portions, wherein the view angle characteristic of the prism lens unit can be adjusted by means of the flat area of the portions and the number of prism portions.

For example, in case of the prism lens having a vertex angle $\Theta_p = 90°$ of a prism and refraction coefficient 1.585 of material (polycarbonate resin) the non-lighting quantity angle is 35.6° degrees according to the following formula:

$$\begin{aligned}\Theta_0 &= \alpha - \sin^{-1}(n \cdot \sin(\alpha - \sin^{-1}(1/n))) \\ &= 45° - \sin^{-1}(1.585 \cdot \sin(45° - \sin^{-1}(1/1.585))) \\ &\approx 35.6°\end{aligned}$$

Since $\Theta_0 > 90°$, the departure of the light beam occurs in the angular direction $\Theta_0$ thanks to the provision of the flat portions.

Figure 13A:
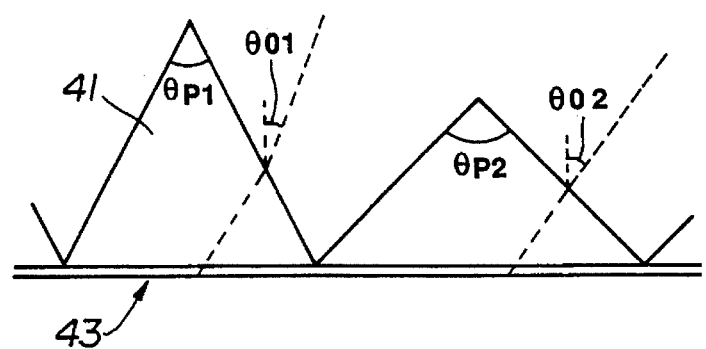
FIG. 13A shows another embodiment of a prism lens according to the present invention.
Figure 13B:
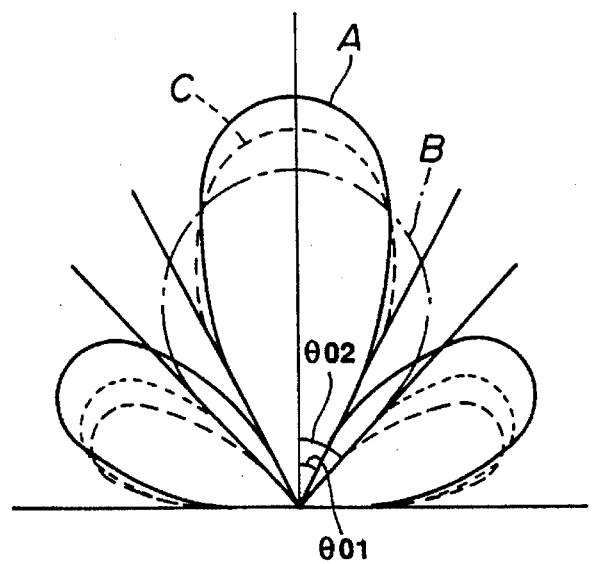
FIG. 13B shows a visual characteristic by means of a vertex angle, the surface area of a flat portion and a quantity of prism portions.
Figure 13C:
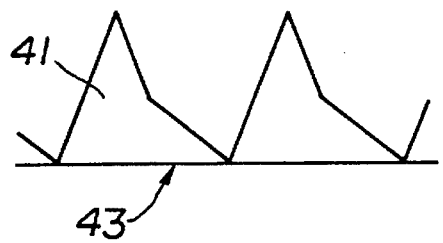
FIG. 13C shows another embodiment of the prism lens.

FIGS. 13A to 13D are construction views of another embodiment of the prism lens according to the present invention. In FIGS. 13A to 13D, numerals 41 and 43 designate a prism portion and a prism lens. In FIG. 13B, A represents a portion of a view angle characteristic of a prism P1 and B represents a portion of a view angle characteristic of a prism P2 and C represents a portion of a view angle characteristic of the whole system. The design of a prism lens unit may be determined by the view angle characteristics and the necessary visual field angles of a liquid crystal display and a back lighting system. When the prism portions of the prism lens unit of FIG. 13A have vertex angles $\Theta_{p1}$ and $\Theta_{p2}$ respectively, the non-lighting quantity angle is defined according to the expression (6):

$$\Theta_{01(2)} = \alpha \cdot \sin^{-1}(n \cdot \sin(\alpha - \sin^{-1}(1/n))) \text{ (where } \alpha = 90° - \Theta_{p1(2)}/2)$$

Since no light appears at angles greater than the above-mentioned angle, a single prism lens sharply loses its luminosity. However, according to the present invention, the provision of prism lenses having different vertex angles enables the light beam to pass at the direction of angle $\Theta_{01(2)}$. The intensity of the light beam directed in the angular direction $\Theta_{01(2)}$ can be adjusted by means of a duty ratio of the vertex angles and the area of the prism portions. FIG.

Figure 13D:
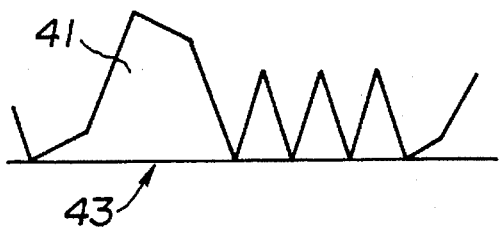
FIG. 13D shows another embodiment of the prism lens.

13C shows a lens unit having different vertex angles at each prism portion. Referring to FIG. 13D, a plurality of prism portions are arranged with the prism portions each having a different vertex angle between two prism portions wherein the view angle, characteristic of the prism lens unit, can be adjusted by means of the prism portions' area and the number of prism portions.

For example, in the case of the prism lens having the vertex angle of 70° ($\Theta_{p1}$) and 100° ($\Theta_{p2}$) of a prism and a refraction coefficient of 1.585, the non-lighting quantity angles are calculated as follows:

$$\Theta_{01} = 33° - \sin^{-1}(1.585 \cdot \sin(33° - \sin^{-1}(1/1.585)))$$
$$\approx 29.3°$$
$$\Theta_{02} = 40° - \sin^{-1}(1.585 \cdot \sin(40° - \sin^{-1}(1/1.585)))$$
$$\approx 38.6°$$

Since the non-lighting quantity angles are shifted from each other by 10°, the combination of the two prisms, having different vertex angles, may generally remove the non-lighting portion.

As described above in the embodiments shown in FIGS. 11A, 11B and FIG. 13A to 13D, it is possible to eliminate the non-lighting quantity angles by adjusting the vertex angles of the prism portions. This means the further possibility to see completely even an image on an LC display when viewing it from the front of the display but you may have any character or figure relieved against the background on the screen of the display when changing the viewing angle to a specified direction. This is achieved by selectively eliminating the non-lighting quantity angle from only a specified portion of the prism lens unit.

Figures 14A, 14B:
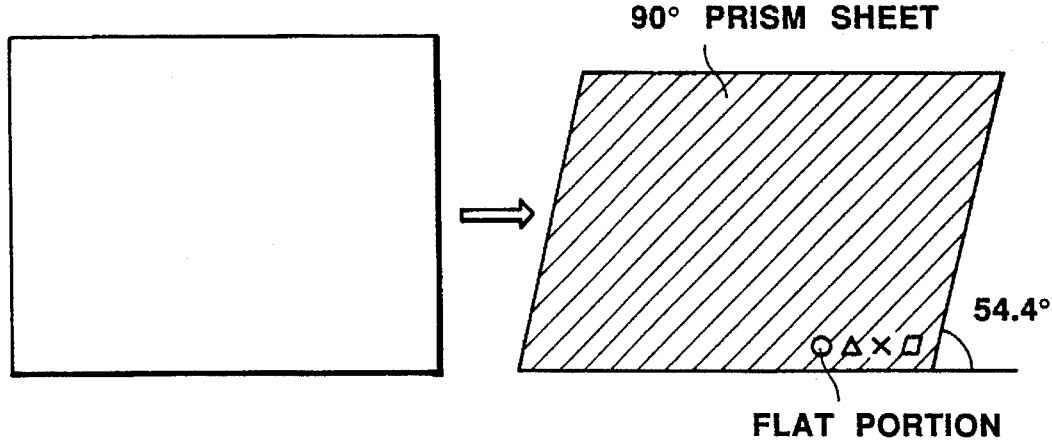
FIG. 14A shows still another embodiment of a prism lens according to the present invention.
FIG. 14B shows a prism lens, which is capable of marking by means of a non-lighting quantity angle of a prism.

FIGS. 14A and 14B show an example for relieving a character or symbol against a background on the LC display screen only at a specified viewing angle by means of providing a flat portion on a prism sheet. For example, in the case of the prism lens having a vertex angle of 90° ($\Theta_p$) and a material refraction coefficient of 1.585, the non-lighting quantity angles are calculated as follows:

$$\Theta_0 = 45° - \sin^{-1}(1.585 \cdot \sin^{-1}(45° - \sin^{-1}(1/1.585)))$$
$$\approx 35.6°$$

When viewing the display screen at a viewing angle of 35.6, you may see thereon the symbols (o∆×□ in FIG. 14B) that can never be seen when viewing them from the front. This enables you to put any symbol, e.g. marking for quality control on the display screen with no fear of affecting the image's quality on the LC display. Furthermore, it is also possible to obtain such an effect that a specified portion of the screen's image may be emphasized with increased luminosity.

Figures 15A, 15B:
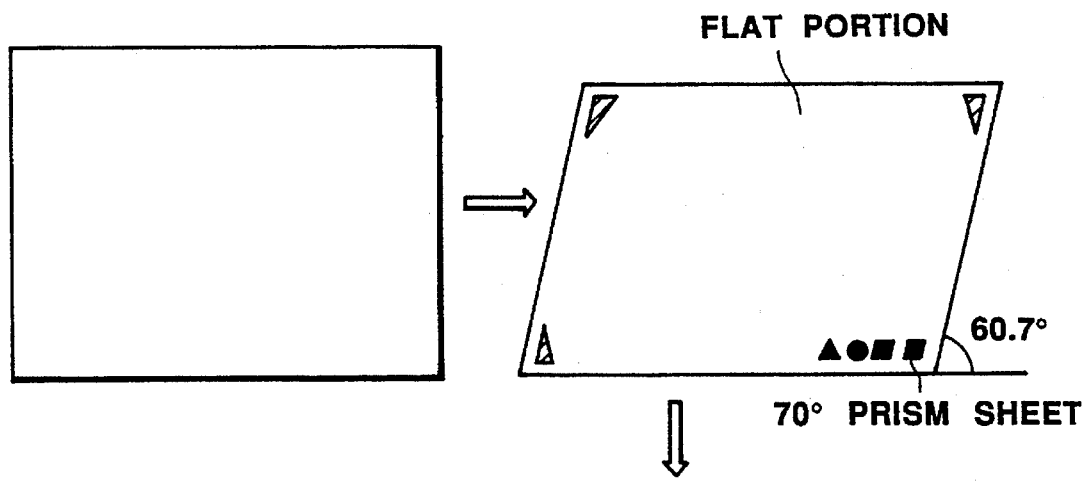
FIG. 15A shows another example of a prism lens of FIG. 14A.
FIG. 15B shows a display screen at a viewing angle of 36.5° shown in FIG. 15A.
Figure 15C:
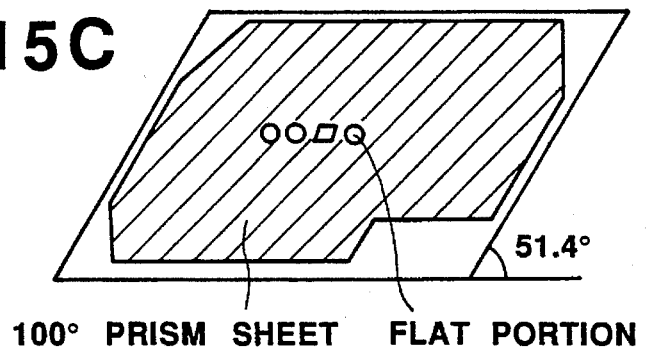
FIG. 15C shows a display screen at a viewing angle of 38.6° shown in FIG. 15A.

FIGS. 15A to 15C show examples for giving a plurality of non-lighting quantity angles to a prism lens unit by providing a prism having a different vertex angle on the part of the prism sheet. For instance, in the case of FIG. 15B which includes a prism having a vertex angle of 70°, normally invisible symbols ▲●■■ become visible only at a viewing angle of 29.3° and in the case of FIG. 15C having a vertex angle of 100° normally invisible symbols oo□o become visible only at a viewing angle of 38.6°. In both cases such visibility is obtained by making the corresponding portions flat.

Figure 16:
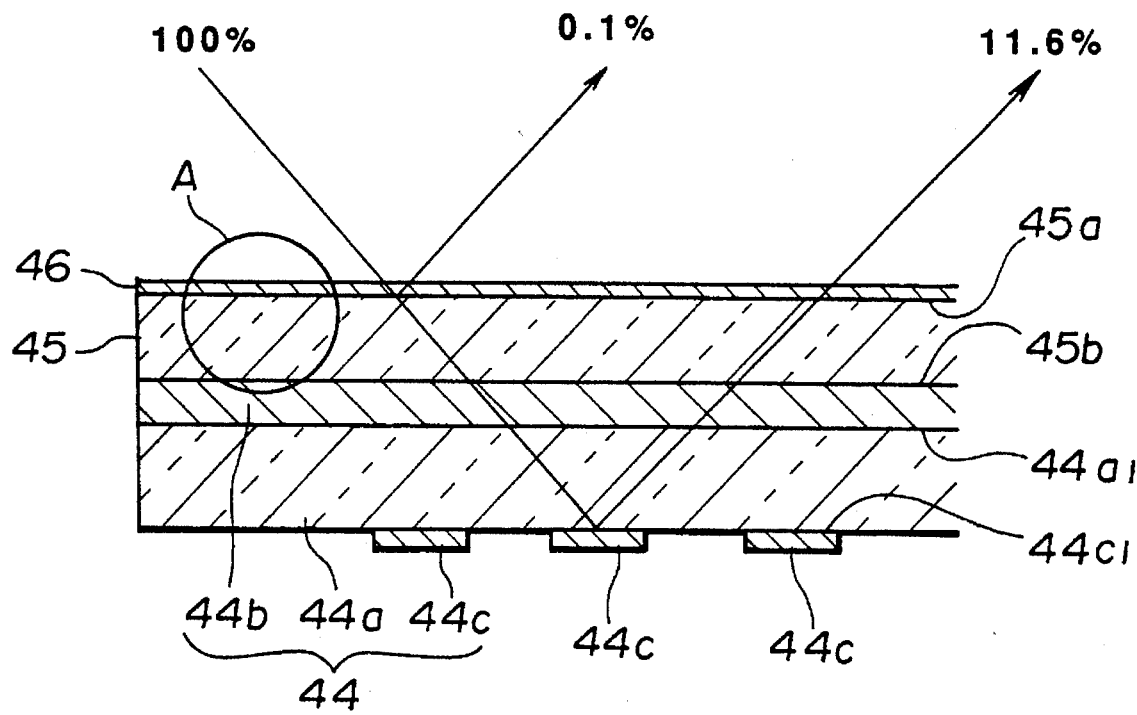
FIG. 16 shows a liquid crystal display embodying the present invention.

FIG. 16 shows a back-lighted transmission type liquid crystal display, by means of example, according to the present invention.

A liquid crystal display according to the present invention comprises a liquid crystal panel 44 which includes a color filter glass 44a, a deflecting plate 44b and a black matrix 44c and so on for obtaining an image transmitting light from a white light emitted by a back light (not shown), and a front transparent plate 45 made of acrylic resin and the like and closely attached to the front surface of the liquid crystal panel (opposite to the side facing to the back light). The front transparent plate 45 serves to protect the liquid crystal panel 44 against direct application of mechanical force and contamination with dusts and dirt.

In thus constructed liquid crystal display, the front transparent plate 45 and the deflecting plate 44b of liquid crystal panel 44 are bonded to each other with adhesive 48 of which the refractive index is nearly equal to the deflecting plate 44b and the front transparent plate 45.

Figure 17:
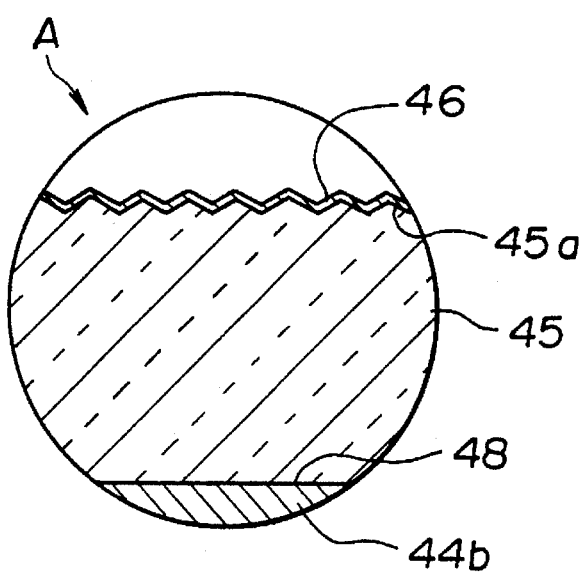
FIG. 17 is an enlarged view of a portion A of FIG. 16.

FIG. 17 is an enlarged view of the portion A of FIG. 16, showing a front transparent panel 43 which has a non-glaring uneven surface portion 45a for converting reflected light to scattered and is coated at the uneven surface with a anti-reflection layer 46 of several angstroms in thickness.

In thus constructed liquid crystal display, white light emitted by a back light (not shown) enters the liquid crystal panel 44 and passes therethrough to form an image on a screen thereof by transmitted light, which is visible through the front transparent plate 45.

The reflection of external light at the front surface of the liquid crystal display is as follows:

The external light reflection at a front (incident) surface 45a of the front transparent plate 45 is reduced to an amount of about 0.1% of incident light by means of the antireflection film 46. No reflection occurs at a surface 45a and a rear surface 45b of the front transparent plate 45 because the front transparent plate 45 bonded to the deflecting plate with the adhesive having nearly equal refractive index that the two plates have. When the incident light passing through the deflecting plate encounters a surface $44c_1$ of the black matrix 44c on the color filter glass 44a on the assumption that reflectance of the black matrix is 30%, an aperture ratio of picture elements is 40% and the a transmittance of the color filter glass is 95%, about 11.6% of the incident light is reflected by the surface $44c_1$ of the black matrix 44c. Total reflection of external incident light at the front surface of the liquid crystal display corresponds to about 11.8% of the external incident light and this figure means that the reflection of external light is reduced to ½ in comparison with the previously described conventional liquid crystal display. The reflection of light at a front surface $44a_1$ (the boundary on the deflecting plate 44b) of the color filter glass 44a is negligible since the refractive index of color filter 44a is nearly equal to that of the deflecting plate 44b.

The front transparent plate 45 prevents the reflection of external incident light by its antireflection film 46 and assures the improved visibility of display screen even at a bright place by scattering the reflected external light by the irregular surface portion on the antireflection coating.

Figures 18A, 18B:
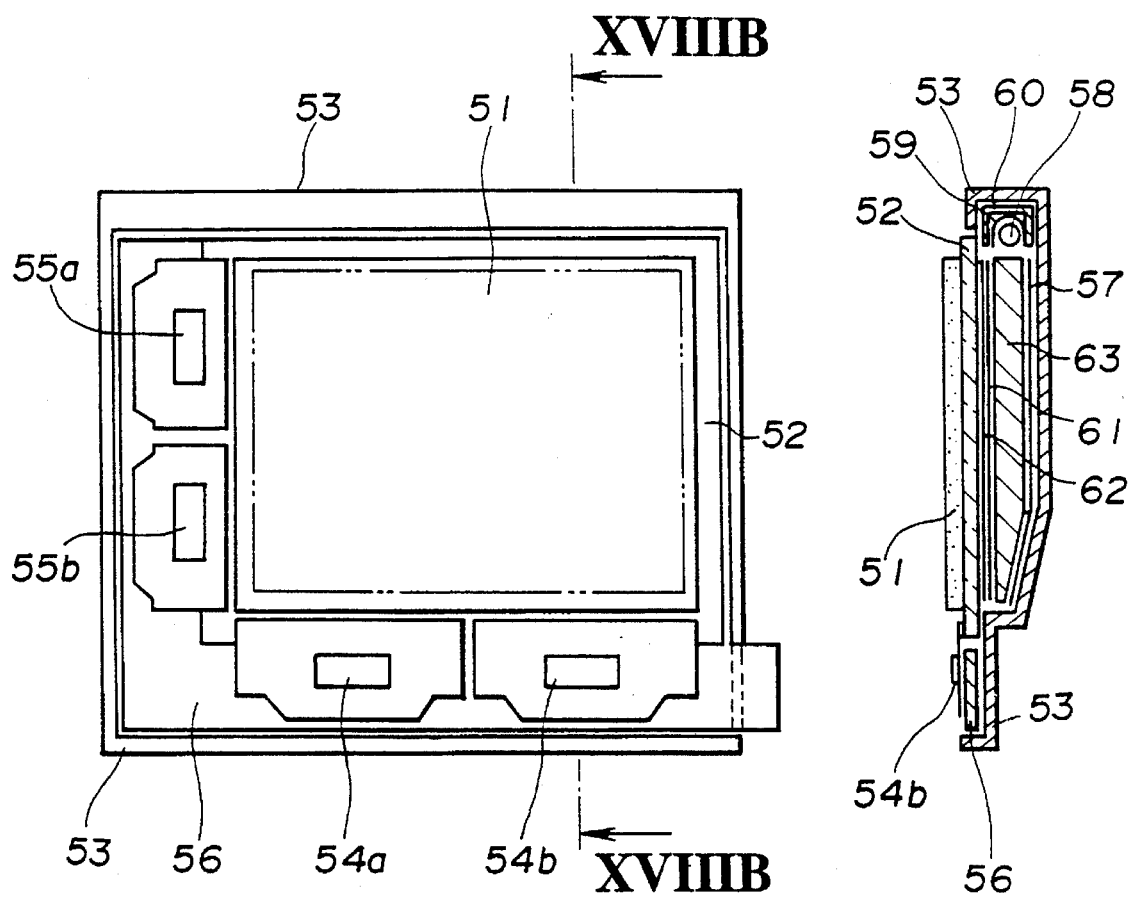
FIG. 18A is a front view of a liquid crystal display embodied in the present invention.
FIG. 18B is a sectional view along line XVIIIB—XVIIIB of FIG. 18A.
Figure 19B:
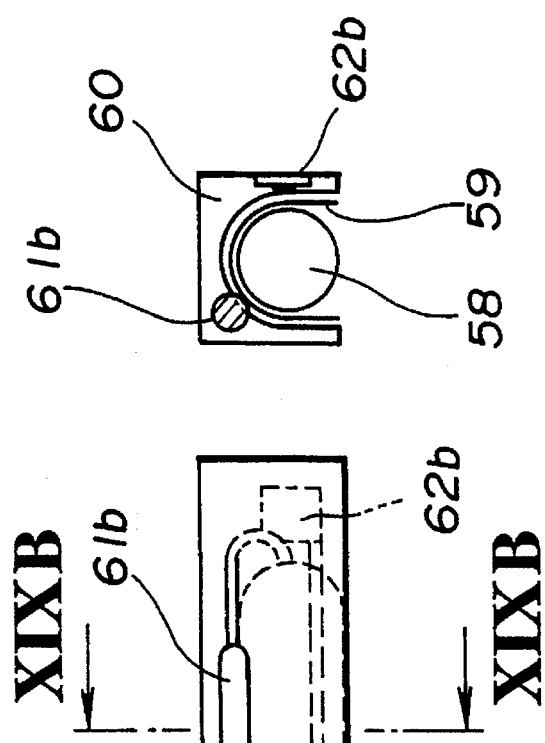
FIG. 19B is a sectional view along line XIXB—XIXB of FIG. 19A.
Figure 19A:
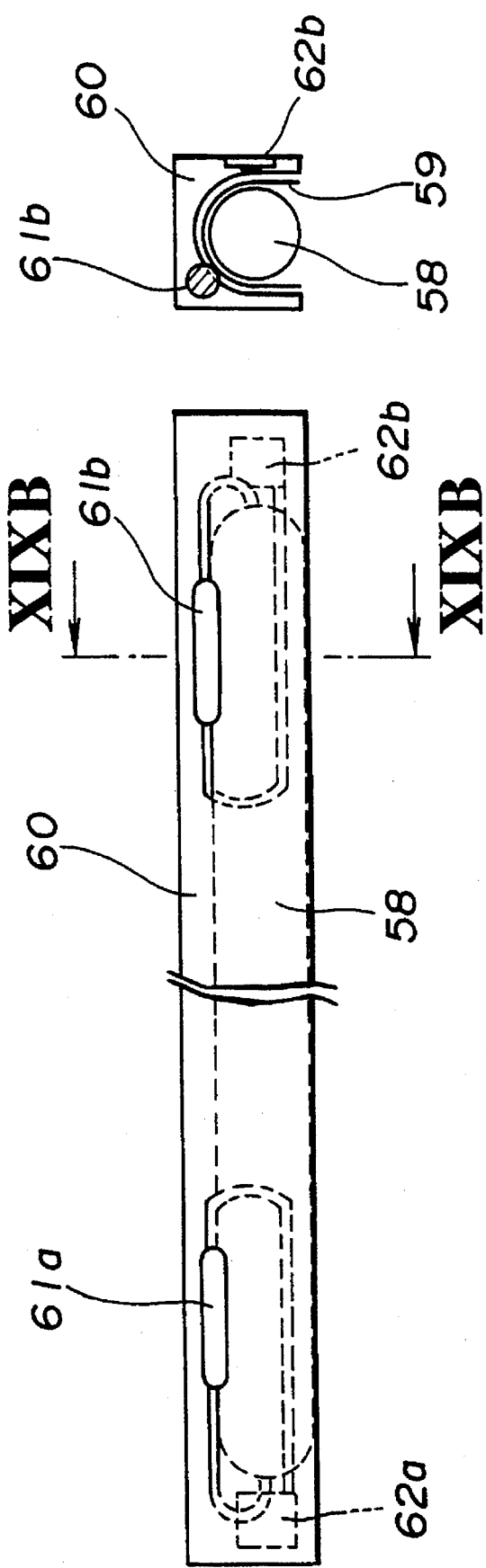
FIG. 19A is a front view of a lamp unit used in the embodiment of liquid crystal display.

FIGS. 18A and 18B are construction views of a liquid crystal display embodying the present invention, which is comprised of a thin-film transistor (TFT), a glass plate 52, a liquid crystal holder 53, IC chips for a horizontal driver 54a, 54b, IC chips for a vertical driver 55a 55b a driver's substrate 56, a reflecting plate 57, a straight tube fluorescent lamp 58, a lamp reflector 59, a lamp holder 60, a diffusing plate 61, a converging plate 62, a light-guiding plate 63. In FIGS. 18A and 18B, numeral 51 designates a flat liquid crystal panel which comprises a glass plate 52 filled with liquid crystal and having a thin-film transistor (TFT) composing picture elements, a color filter RGB, black matrices between picture elements and bus lines to each picture element, and a driver substrate 56 on which IC chips 54b, 54b for a horizontal driver and IC chips 55a, 55b for a vertical driver are mounted. The IC chips 54a and 54b are disposed at the lower edge of the glass plate 52 and the IC chips 55a and 55b are disposed at the left side edge of the glass plate 52. There IC chips are electrically connected with the TFT picture elements of the glass plate 52. The lamp unit contains a straight tube-type fluorescent lamp 58 and is disposed on a side surface (the upper surface in FIG. 18B) of a back lighting unit. A lamp holder 60 holds the straight tube-type fluorescent lamp 58, a lamp reflector 59 enclosing the lamp, as shown in detail in FIGS. 19A and 19B. It also includes safety thermal fuses 61a, 61b. Lead wires of the lamp 58 through the thermal fuses 61a, 61b are electrically connected to electrode terminals 62a and 62b provided at the external surface of the lamp holder 60.

The back light unit is composed of a light-guiding plate 63 for receiving therein light rays from the fluorescent lamp 58 through the lateral surface thereof and uniformly propagating and diffusing the light over a whole display screen, a reflecting plate 57 disposed on the rear surface of the light-guiding plate 63 so as to reflect the light therefrom, a diffusing plate 61 for diffusing light from the front surface of the light-guiding plate 63 and a converging plate 62 for converging light from the diffusing plate according to a directional characteristic substantially corresponding to a view angle characteristic of a liquid crystal panel 51. These components are disposed all in flat layers on the rear surface of the glass plate 52.

The above-mentioned liquid crystal panel 51, the lamp unit and the back light unit are held by a liquid crystal display holder 53.

Light rays emitted by the fluorescent lamp 58 and light rays reflected by the reflector 59 enter the light-guiding plate 63 through its lateral surface, wherein they uniformly propagate and are diffused. The reflecting plate 57 reflects light rays leaking from the bottom surface of the light-guiding plate 63 and injects them again into the light-guiding plate 63. Light rays pass through the front surface of the light-guiding plate 63 and enter into the converging plate 62 whereby they are further converged in the direction toward the front surface of the liquid crystal panel 51. Consequently, the light rays from the converging plate 62 can have a directional characteristic substantially corresponding to the view angle characteristic of the liquid crystal panel, remarkably increasing the front axial luminosity of the display screen.

The lamp unit integrally holding the fluorescent lamp 58 together with the lamp reflector 59 can be removably secured to the lamp holder 60 located within the liquid crystal display holder 53 (FIG. 18B). Therefore, when the lamp 58 reaches the end of its useful life or is damaged, anyone can easily replace the entire lamp unit with a new one.

Figure 20:
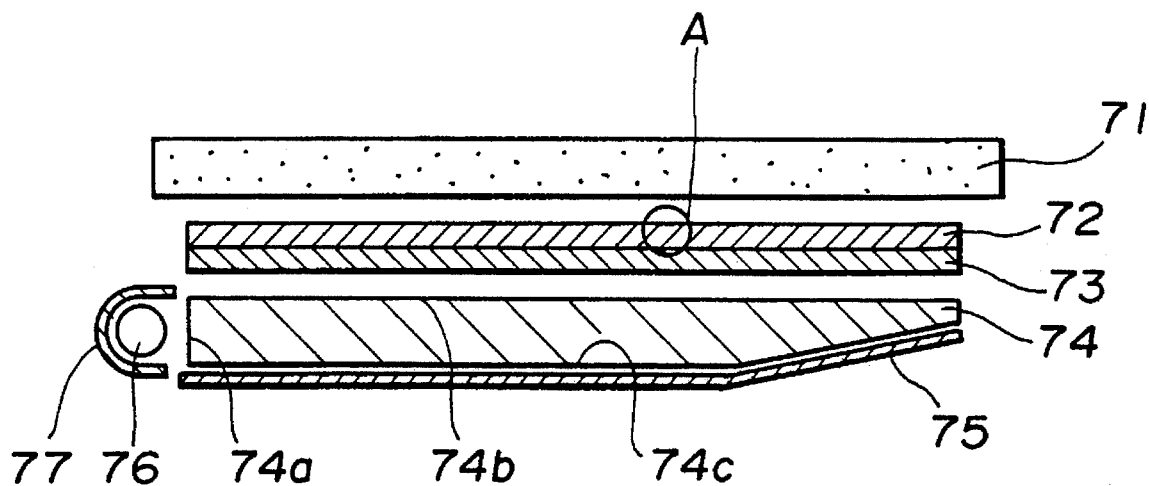
FIG. 20 is a view for explaining the construction of a back lighting device embodied in the present invention.

FIG. 20 is a construction view of a light-guiding type back lighting device embodying the present invention, which is comprised of a liquid crystal panel 71, a converging plate 72, a diffusing plate 73, a light-guiding plate 74 having a lateral inlet portion 74a, a front surface 74b and a bottom surface 74c, a reflecting plate 75, a lamp 76 and a reflector 77.

Light rays from the fluorescent lamp 76 enter, directly or after reflection by the reflector 77, into the light-guiding plate 74 through the lateral inlet surface 74a, repeatedly reflecting at the bottom surface 74c and on the front surface 74b thereof and then being emitted as homogeneous back light rays directed upward from the front surface thereof. At the back of the light-guiding plate 74 is placed the reflecting plate 75 by which light rays, leaking from the bottom surface of the light-guiding plate 74 are reflected and returned into the light-guiding plate 74, thereby light rays can be effectively used. Light rays emitted from the light-guiding plate 74 are diffused in the diffusing plate 73 to produce homogeneous by diffused light having small directionality which illuminates the liquid crystal panel 71.

This embodiment differs from the conventional back lighting device shown in FIG. 9 in that a prism-like converging plate 72 is provided between the liquid crystal panel 71 and the diffusing plate 73. In the embodiment, back lighting rays directed upward and downward at an angle are converged in an axial direction by the prism-like converging plate 72. Consequently, the embodiment may have the view angle characteristic C shown in FIG. 26, which is similar in directionality with characteristic D of the liquid crystal panel and may have a remarkably increased axial luminosity in comparison with the view angle characteristics B and B', shown in FIG. 26, of the conventional diffusing plates.

Figure 21:
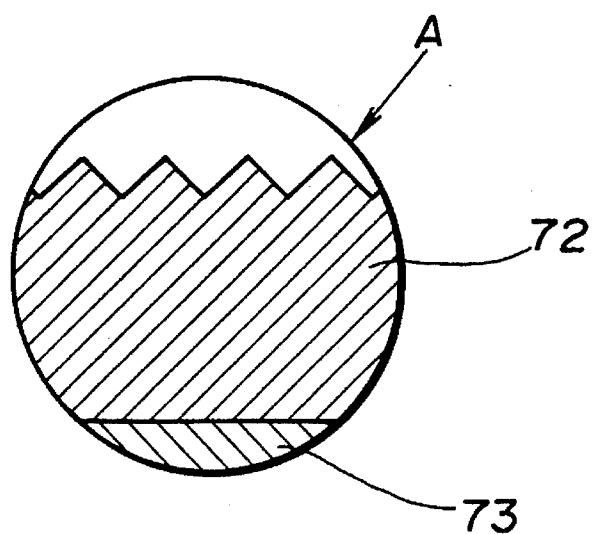
FIG. 21 is an enlarged section of a portion A of FIG. 20.

Application of the converging plate 72 having prism-like grooves, shown in the enlarged section in FIG. 21, in a horizontal direction is effective for obtaining converging characteristics in a vertical view angle direction. If the spacing between prism-like grooves of the converging plate 72 is substantially equal to that of the vertical picture elements of the liquid crystal panel 71, there may occur periodical uneven luminosity which appears as more fringes on an image of the liquid crystal display.

Accordingly, when the picture elements of the liquid crystal panel 71 are arranged, for example, at intervals of about 200 μm in a vertical direction, the prism-like grooves of the converging plate 72 shall be arranged at intervals of not more than 50 μm, thereby the possibility of the occurrence of moire fringes can be eliminated.

Figure 22:
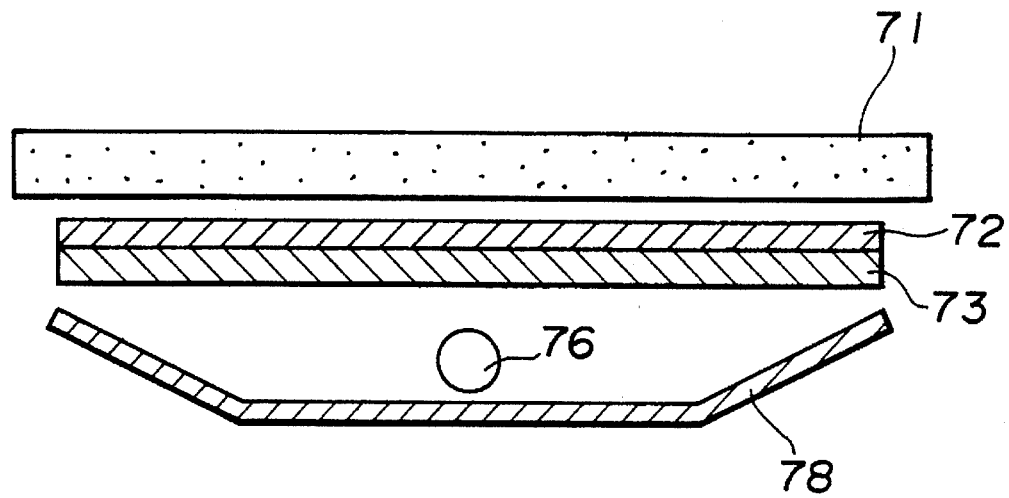
FIG. 22 is a view of another embodiment of a back lighting device according to the present invention.

FIG. 22 is a construction view of a back lighting device of a direct bottom-reflecting type wherein a reflecting plate is designated by numeral 78 and other components similar to those of FIG. 20 shown with like numerals. The embodiment differs from the prior art shown in FIG. 10 in that a converging plate having prism-like grooves 72 arranged at narrow intervals is placed on a diffusing plate 73.

In this case, back light rays directed upwards and downwards at an angle come together in the axial direction by the prism-like converging plate 72. Thereby, the embodiment may have the view angle characteristic C shown in FIG. 26, which is similar in direction to characteristic D of the liquid crystal panel and may attain a remarkable improvement of axial luminosity similar to the above-mentioned case.

Figures 23A, 23B:
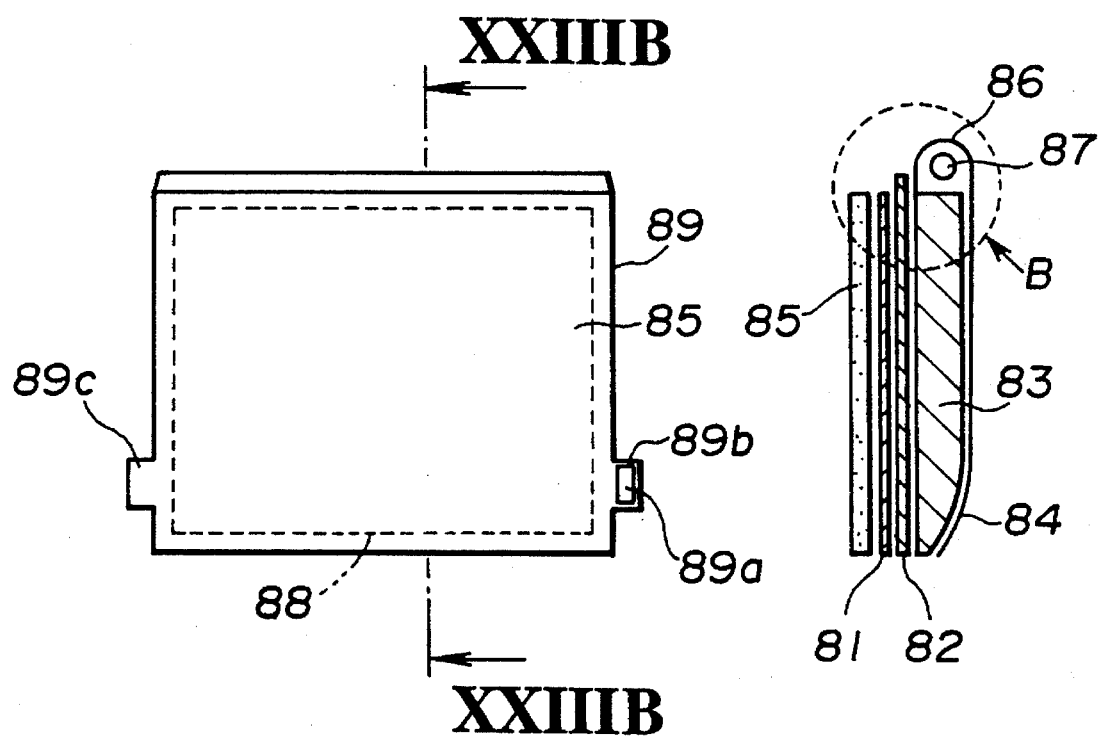
FIG. 23A is a view of still another embodiment of a back lighting device according to the present invention.
FIG. 23B is a sectional view along line XXIIIB—XXIIIB of FIG. 23A.
Figure 24:
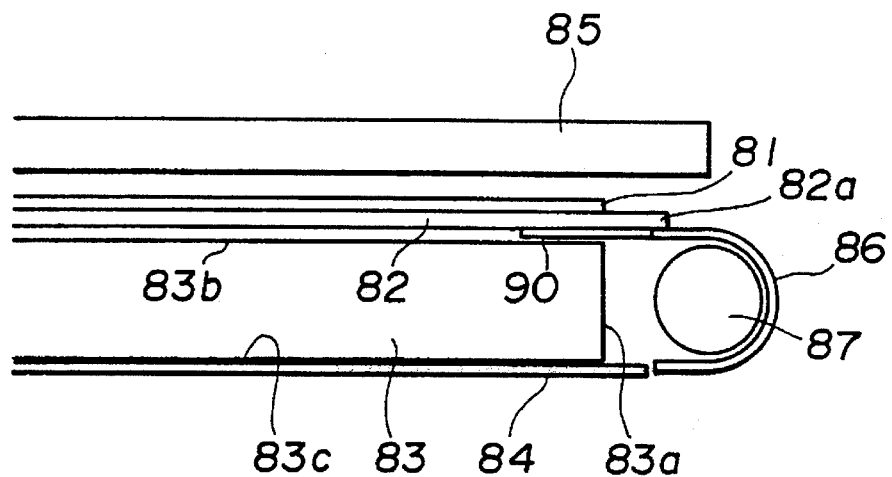
FIG. 24 is an enlarged section of a portion B of FIG. 23B.

FIGS. 23A and 23B are construction views of a back lighting device using a welded light-guiding unit, and FIG. 24 shows the portion B of FIG. 23B in an enlarged scale. In FIGS. 23A, 23B and FIG. 24, there are shown a converging plate 81, a diffusing plate 82 having a protrusion 82a, a light guide plate 83 having an inlet portion 83a, a front surface 83b and a bottom surface 83c, a reflecting plate 84, and image area of a liquid crystal panel 85, a reflector 86, a lamp 87, a liquid crystal panel 88, a back lighting unit 89 with a welded portion 89a and protrusions 89b, 89c, and a reflecting element 90.

Light rays from the fluorescent lamp 87 are injected, directly or after reflection by the reflector 86, into the diffusing plate 83 through the inlet portion 83a thereof, wherein they repeatedly reflect at the bottom surface 83c and the front surface 83b and then exit from the front surface 83b. The reflecting plate 84 reflects light rays leaking from the bottom surface of the light guiding plate 83 and again injects them into the light guiding plate 83. The light rays from the light guiding plate 83 enter into the converging plate 82 wherein they are diffused to homogeneous light rays having no direction. In the embodiment, between the diffusing plate and the liquid crystal panel, the converging plate 81 is provided which enables light rays of conventional view angle characteristic B', substantially even as shown in FIG. 26, to have a view angle characteristic C similar to that of the liquid crystal panel, causing upward, downward and diagonal light rays to converge in the front axial direction. Such light rays assure the increased front luminosity of an image on the liquid crystal panel. The converging plate, having prism-like grooves in the horizontal direction, is effective for obtaining the required converging characteristic in a vertical visual, angled direction. However, if spacing between prism-like grooves of the converging plate is substantially equal to that of the vertical picture elements of the liquid crystal panel, there may occur periodical uneven luminosity which appears as moire fringes on an image indicated on the liquid crystal display. Accordingly, when the picture elements of the liquid crystal panel are arranged, for example, at intervals of about 200 μm in a vertical direction, the prism-like grooves of the converging plate shall be arranged at intervals of not more than 50 μm, thereby eliminating moire fringes.

The present invention also proposes a method for welding the above-mentioned components to form an integrated unit which will be described in detail as follows:

In the case when a light guiding plate 83 and a diffusing plate 82, each made of acrylic resin having a thermal expansion coefficient of 6 to $7\times10^{-5}$ cm/cm/°C., a converging plate 81 made of polycarbonate resin, having a thermal expansion coefficient of about $2\times10^{-5}$ cm/cm/°C. and a reflecting plate having a thermal expansion coefficient of about $1.8\times10^{-5}$ cm/cm/°C. are welded with each other at the periphery to form one unit having an area size equal to a 4-inch display screen. The unit in operation at temperatures of 0° to 50° C. may be subjected to thermal deformation by about 0.2 to 0.3 mm thereby causing on uneven luminosity of back light. Accordingly, the present invention provides such a method as shown in FIG. 23A the back light unit 89 is made in a size larger than the liquid crystal display screen 88 by about 3 mm at each peripheral edge and its components each are welded at one of two locating protrusions 89b, 89c provided for mounting to a back-lighting holder 91 as shown in FIG. 25B. The proposed method may eliminate the possibility of causing an uneven luminosity in the weld portion of the unit on the display screen as well as eliminating the possibility of the occurrence of uneven luminosity due to the thermal deformation of the components since each component can freely expand and shrink.

Figure 25A:
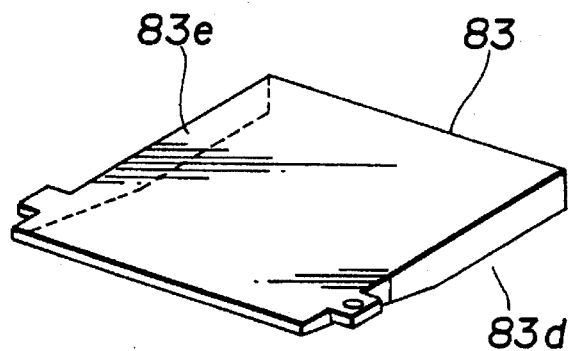
FIG. 25A is a view of another embodiment of a back lighting device according to the present invention.
Figure 25B:
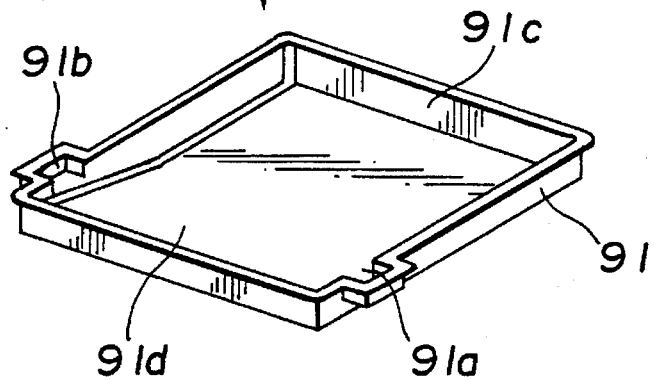
FIG. 25B is a view of another embodiment of a back lighting device shown in FIG. 25A.

Protection from leakage of the light rays from the periphery of the light guiding plate of the device is improved as follows:

One of the proposed methods is to adhesively attach reflecting plates 83d,83e respectively to both side surfaces of a lighting guide 83 as shown in FIG. 25A.

The other method is such that the lighting guide plate 83 is enclosed at all surfaces by opposing surfaces of other components and by surfaces, except for upper surface 91d for mounting a liquid crystal panel, of a back lighting holder 91 shown in FIG. 25B. All opposed surfaces of the components are made of or coated with a material of a high reflective power.

FIG. 24 shows a portion B of FIG. 23B to an enlarged scale. The portion between a lamp 87 and a light inlet surface 83a of a light guiding plate 83 is enclosed by a reflector 86 and a reflecting plate 84, but, as shown in FIG. 23B, a diffusing plate 82 has an end 82a protruding in the direction of the reflector 86. Therefore light rays emitted by the lamp 87 may leak through the protruding end 82a of the diffusing plate 82 and travel toward the liquid crystal panel 85 causing uneven luminosity on the display screen and resulting in a loss of illumination. Accordingly, a light reflecting element 90 is adhesively attached to the lower surface of the protrusion 82a of the diffusing plate 82 to prevent the leakage of light rays therethough.

We claim:
1. A liquid crystal display comprising:
a display means for displaying characters and graphics, said means including a display portion comprising at least a liquid crystal panel;
an illuminating means for illuminating the display portion of the liquid crystal panel; and
a converging means for converging light rays from the illuminating means at the display portion of the liquid crystal panel;
and said display characterized in that the illuminating means comprises a lamp, a light-guiding plate for receiving therein light rays of the lamp through a lateral surface thereof and for uniformly propagating and diffusing the light rays therein, a reflecting plate disposed on the rear surface of the light-guiding plate to reflect light rays from the rear surface of the light-guiding plate, and a diffusing plate disposed on the front surface of the light-guiding plate to diffuse light rays from the front surface of the light-guiding plate and in that the converging means, the light-guiding plate, the reflecting plate, and the diffusing plate are integrally welded to each other at least one peripheral position not affecting the display portion of the liquid crystal panel.

2. A liquid crystal display comprising:
a display means for displaying characters and graphics, said means including a display portion comprising at least a liquid crystal panel;
an illuminating means for illuminating the display portion of the liquid crystal panel, said illuminating means comprising a lamp unit integrally formed of at least a lamp and a lamp reflector for reflecting light rays from the lamp in one direction, and a back light unit integrally formed of a light-guiding plate for receiving therein light rays of the lamp through a lateral surface thereof and for uniformly propagating and diffusing the light rays therein, and a reflecting plate disposed on the rear surface of the light-guide plate to reflect light rays from the rear surface of the light-guiding plate; and a diffusing plate disposed on the front surface of the light-guiding plate to diffuse light rays from the front surface of the light-guide plate;
a converging means for converging light rays from the illuminating means at the display portion of the liquid crystal panel;
a liquid crystal display holder for holding the lamp unit, the back light unit and the liquid crystal panel in definite positions; and
at least one integrated-circuit chip for a horizontal driver and at least one integrated-circuit chip for a vertical driver each being respectively mounted only on one of two adjacent peripheral edge portions of the liquid crystal panel, the lamp unit being removably mounted in the liquid crystal display holder opposite one of said edge portions of the liquid crystal panel on which said drivers are mounted.

3. A liquid crystal display according to claim 2 wherein said liquid crystal display holder comprises: a frame member having a wrap around flange along one side edge for receiving the lamp unit therein, an angulated back wall surface portion forming a cavity conforming to the shape of the light-guiding plate and the reflecting plate, and inwardly projecting back wall surface portions extending from the angulated back wall surface portion adjacent the horizontal and vertical drivers.

4. A liquid crystal display according to claim 3 wherein said lamp unit includes a lamp holder member located within the wrap around flange and wherein the lamp and lamp reflector are removably secured to the lamp holder member.

5. A liquid crystal display according to claim 2 and wherein the liquid crystal panel is offset in the horizontal and vertical directions from the center of the liquid crystal display holder.

6. A liquid crystal display according to claim 2 wherein said at least one integrated circuit chip for a horizontal driver comprises a first pair of integrated circuit chips and said at least one integrated circuit chip for a vertical driver comprises a second pair of integrated circuit chips.

* * * * *